United States Patent
Suh et al.

(10) Patent No.: US 10,161,789 B2
(45) Date of Patent: Dec. 25, 2018

(54) EVENT-BASED SENSOR AND PIXEL OF EVENT-BASED SENSOR

(71) Applicant: SAMSUNG ELECTRONICS CO., LTD., Suwon-si (KR)

(72) Inventors: Yunjae Suh, Suwon-si (KR); Junseok Kim, Hwaseong-si (KR); Sung Ho Kim, Yongin-si (KR); Eric Hyunsurk Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 179 days.

(21) Appl. No.: 15/049,326

(22) Filed: Feb. 22, 2016

(65) Prior Publication Data

US 2017/0059399 A1 Mar. 2, 2017

(30) Foreign Application Priority Data

Sep. 1, 2015 (KR) .................. 10-2015-0123603

(51) Int. Cl.
  *H04N 5/378* (2011.01)
  *G01J 1/42* (2006.01)
  *G06F 3/03* (2006.01)
  *H04N 5/3745* (2011.01)

(52) U.S. Cl.
  CPC .............. *G01J 1/42* (2013.01); *G06F 3/0304* (2013.01); *H04N 5/378* (2013.01); *H04N 5/3745* (2013.01)

(58) Field of Classification Search
  CPC ........................ H04N 5/378; H04N 5/3745
  See application file for complete search history.

(56) References Cited

U.S. PATENT DOCUMENTS

| 2013/0229555 A1* | 9/2013 | Hashimoto | H04N 5/378 348/300 |
| 2014/0125994 A1 | 5/2014 | Kim et al. | |
| 2015/0069218 A1 | 3/2015 | Cho et al. | |
| 2015/0281613 A1 | 10/2015 | Vogelsang et al. | |

(Continued)

FOREIGN PATENT DOCUMENTS

| JP | 4727947 B2 | 7/2011 |
| JP | 2015-35637 A | 2/2015 |
| KR | 10-2013-0040517 A | 4/2013 |

(Continued)

OTHER PUBLICATIONS

Serrano-Gotarredona et al., "A 128×128 1.5% Contrast Sensitivity 0.9% FPN 3 µs Latency 4mW Asynchronous Frame-Free Dynamic Vision Sensor Using Transimpedance Preamplifiers", IEEE Journal of Solid-State Circuits, vol. XX, No. X,XXX, Mar. 2013, 19 total pages.

(Continued)

*Primary Examiner* — Tony Ko
(74) *Attorney, Agent, or Firm* — Sughrue Mion, PLLC

(57) ABSTRACT

An event-based sensor and a pixel of the event-based sensor are provided. The event-based sensor includes a pixel array including pixels, a selection circuit configured to select a part of the pixels, an event circuit configured to generate an event signal indicating an active pixel sensing an event among the selected part of the pixels, based on output signals of the selected part of the pixels, and an output circuit configured to output information indicating the active pixel based on the event signal.

28 Claims, 11 Drawing Sheets

(56) References Cited

U.S. PATENT DOCUMENTS

2016/0227135 A1    8/2016  Matolin et al.

FOREIGN PATENT DOCUMENTS

| KR | 10-2014-0005421 A | 1/2014 |
|----|-------------------|--------|
| KR | 10-2014-0006465 A | 1/2014 |
| KR | 10-2014-0056986 A | 5/2014 |
| KR | 10-1507609 B1     | 3/2015 |
| WO | 2010084493 A1     | 7/2010 |
| WO | 2014055391 A2     | 4/2014 |
| WO | 2015036592 A1     | 3/2015 |

OTHER PUBLICATIONS

Lichtsteiner et al., "A 128×128 120 dB 15 μs Latency Asynchronous Temporal Contrast Vision Sensor", IEEE Journal of Solid-State Circuits, vol. 43, No. 2, Feb. 2008, 11 total pages.
Communication dated Nov. 21, 2016 issued by the European Patent Office in counterpart European Patent Application No. 16173666.5.
Communication dated Feb. 28, 2018 issued by the European Patent Office in counterpart European Patent Application No. 16173666.5.

* cited by examiner

EVENT-BASED SENSOR AND PIXEL OF EVENT-BASED SENSOR

CROSS-REFERENCE TO RELATED APPLICATION

This application claims priority from Korean Patent Application No. 10-2015-0123603, filed on Sep. 1, 2015 in the Korean Intellectual Property Office, the disclosure of which is incorporated herein by reference in its entirety.

BACKGROUND

1. Field

Methods and apparatuses consistent with exemplary embodiments relate to an event-based sensor and a pixel of the event-based sensor.

2. Description of the Related Art

A human-computer interaction (HCI) is realized and operates in a user interface. Various user interfaces used to recognize user inputs may provide a natural interaction between humans and computers.

To recognize a user input, various sensors may be used. To provide a natural interaction, a sensor quickly responding to a user input may be used. Also, a device that consumes relatively low power while performing various smart functions using a user interface may be used among various mobile devices.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an event-based sensor including a pixel array including pixels, a selection circuit configured to select a part of the pixels, an event circuit configured to generate an event signal indicating an active pixel sensing an event among the selected part of the pixels, based on output signals of the selected part of the pixels, and an output circuit configured to output information indicating the active pixel based on the event signal.

The event may include an event in which an intensity of light changes.

The event signal may include an address of the active pixel.

Each of the pixels may be configured to output an output signal indicating an amount of change in an intensity of light, in response to the selection circuit selecting a corresponding one of the pixels.

The event-based sensor may further include a reset circuit configured to reset the active pixel based on the event signal.

The reset circuit may be further configured to apply a reset signal to the active pixel in response to the event signal.

The pixel array may have a two-dimensional (2D) matrix structure, and the selection circuit may be configured to sequentially select rows included in the 2D matrix structure, based on a period.

The event circuit may include a comparator configured to compare an output signal among the output signals to a reference signal to generate the event signal, and an analog-to-digital converter (ADC) configured to measure a strength of the output signal.

The event circuit may include a low-resolution ADC configured to compare an output signal among the output signals to reference signals to generate the event signal, and a high-resolution ADC configured to measure a strength of the output signal.

The pixel array may have a two-dimensional (2D) matrix structure, and the event circuit may include sub-event circuits corresponding to columns included in the 2D matrix structure.

The output circuit may include sub-output circuits, and each of the sub-output circuits may be connected to a corresponding one of the sub-event circuits.

The event circuit may be further configured to generate a first event signal in response to the active pixel sensing a first type of events in which an intensity of light increases, and generate a second event signal in response to the active pixel sensing a second type of events in which an intensity of light decreases.

Each of the pixels may include a sensing circuit configured to sense an intensity of light, and generate a first voltage indicating the sensed intensity of light, a time-varying circuit configured to generate a second voltage indicating an amount of change in the intensity of the light, based on the first voltage, and a buffer circuit configured to output a third voltage having a value that is the same as a value of the second voltage in response to the selection circuit selecting a corresponding one of the pixels.

The sensing circuit may include a photodiode configured to sense the intensity of light incident on the corresponding one of the pixels, and a first amplifier configured to amplify an output of the photodiode so that a value of the first voltage is linearly proportional to the sensed intensity.

The time-varying circuit may include a capacitor connected in series to the sensing circuit.

The time-varying circuit may further include a second amplifier configured to amplify, at a ratio, an amount of charge that is stored in the capacitor based on a change in the first voltage.

The time-varying circuit may further include a switch configured to reset an amount of charge that is stored in the capacitor, based on a reset signal the selection circuit selecting the corresponding one of the pixels.

The buffer circuit may include a source follower configured to generate the third voltage based on the second voltage, and a transistor configured to output the third voltage in response to the selection circuit selecting the corresponding one of the pixels.

The event-based sensor may further include a reference signal providing circuit configured to provide a reference signal to the event circuit based on a voltage drop.

The pixel array may have a two-dimensional (2D) matrix structure, the reference signal providing circuit may include replica pixels corresponding to rows included in the 2D matrix structure, and each of the replica pixels may be configured to output the reference signal in response to the selection circuit selecting a corresponding one of the replica pixels.

The reference signal providing circuit may include first replica pixels configured to output a first reference signal for a first type of events in which an intensity of light increases, and second replica pixels configured to output a second reference signal for a second type of events in which an intensity of light decreases.

According to an aspect of another exemplary embodiment, there is provided a pixel of an event-based sensor, the pixel including a sensing circuit configured to sense an intensity of light, and generate a first signal indicating the sensed intensity of the light, a time-varying circuit configured to generate a second signal indicating an amount of change in the intensity of the light, based on the first signal, a buffer circuit configured to output a third signal having a strength that is the same as a strength of the second signal in response to a selection signal, and a reset circuit configured to reset the time-varying circuit in response to a combination of a reset signal and the selection signal.

The sensing circuit may include a photodiode configured to sense the intensity of light incident on the pixel, and a first amplifier configured to amplify an output of the photodiode so that a strength of the first signal is linearly proportional to the sensed intensity.

The time-varying circuit may include a capacitor connected in series to the sensing circuit.

The time-varying circuit may further include a second amplifier configured to amplify, at a ratio, an amount of charge that is stored in the capacitor based on a change in the first signal.

The reset circuit may include an AND element configured to perform an AND operation on the selection signal and the reset signal, and the time-varying circuit may further include a switch configured to reset an amount of charge that is stored in the capacitor based on an output of the AND element and a bias voltage.

The buffer circuit may include a source follower configured to generate the third signal based on the second signal, and a transistor configured to output the third signal in response to the selection signal.

According to an aspect of another exemplary embodiment, there is provided an event-based sensor including a pixel array including pixels, and a row driver configured to activate pixels in a row of the pixels, each of the activated pixels being configured to generate an output signal indicating an amount of change in an intensity of light incident on a corresponding one of the activated pixels. The event-based sensor further includes an event circuit configured to generate an event signal indicating an activated pixel sensing an event among the activated pixels, based on the output signal of each of the activated pixels, and an output circuit configured to output information indicating the activated pixel based on the event signal.

The event-based sensor may further include an OR element configured to apply a reset signal to the activated pixels based on the event signal.

The event circuit may include a first comparator configured to determine whether the output signal is greater than a first reference signal, and generate a first event signal indicating a first type of events in which the intensity of light increases, in response to the first comparator determining that the output signal is greater than the first reference signal, and a second comparator configured to determine whether the output signal is less than a second reference signal, and generate a second event signal indicating a second type of events in which the intensity of light decreases, in response to the second comparator determining that the output signal is less than the second reference signal.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
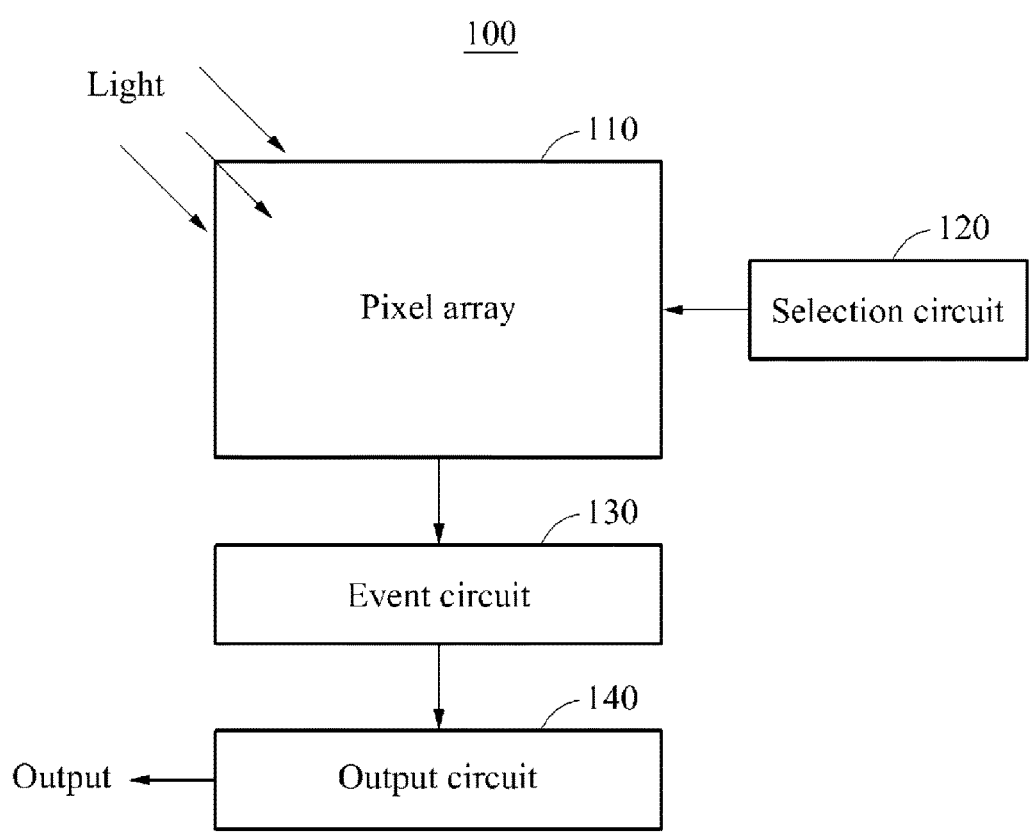
FIG. 1 is a block diagram illustrating a configuration of an event-based sensor according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "include," "including," "comprises" and/or "comprising" used herein specify the presence of stated features or components, but do not preclude the presence or addition of one or more other features or components. In addition, the terms such as "circuit", "unit," "-er (-or)," and "module" described in the specification refer to an element for performing at least one function or operation, and may be implemented in hardware, software, or the combination of hardware and software.

FIG. 1 is a block diagram illustrating a configuration of an event-based sensor 100 according to an exemplary embodiment. Referring to FIG. 1, the event-based sensor 100 includes a pixel array 110, a selection circuit 120, an event circuit 130, and an output circuit 140.

The pixel array 110 may include a plurality of pixels. Each of the pixels may output an output signal in response to a selection of the selection circuit 120. Each of pixels of a general sensor may output an output signal corresponding to an intensity of light, whereas each of the pixels in the pixel array 110 may output an output signal corresponding to an amount of change in an intensity of light. The pixel array 110 may correspond to, for example, a two-dimensional (2D) matrix structure as shown in a pixel array 210 of FIG. 2. A structure of each of the pixels in the pixel array 110 will be described with reference to FIGS. 3, 4 and 5.

The selection circuit 120 may select a part of the pixels in the pixel array 110. For example, the selection circuit 120 may select a single row from a plurality of rows included in a 2D matrix structure corresponding to the pixel array 110. The selection circuit 120 may sequentially select the rows based on a predetermined period. The selection circuit 120 may be, for example, a row driver 220 of FIG. 2. The row driver 220 may generate a selection signal to select a single row from a plurality of rows.

The selection circuit 120 may select a predetermined row, and all pixels in the selected row may be output signals to the event circuit 130. The event circuit 130 may determine whether an error occurs in a column.

The event circuit 130 may generate an event signal corresponding to an active pixel based on output signals of pixels selected by the selection circuit 120. The active pixel may be a pixel to sense an event among the selected pixels. For example, the event may be an event in which an intensity of light changes. In this example, the active pixel may output an output signal corresponding to an amount of change in the intensity of the light that is equal to or greater than a threshold. For example, the event circuit 130 may compare output signals to a reference signal. The reference signal may be a signal used to determine whether an amount of change in an intensity of light is equal to or greater than a threshold. The event circuit 130 may detect an active pixel that outputs an output signal greater than the reference signal, and may generate an event signal corresponding to the detected active pixel.

The event circuit 130 may include a plurality of sub-event circuits corresponding to a plurality of columns included in the 2D matrix structure corresponding to the pixel array 110. Each of the sub-event circuits may compare the reference signal to an output signal of a pixel included in a corresponding column, and may determine whether the pixel is an active pixel. Each of the sub-event circuits may output an event signal by determining that the pixel is the active pixel. Examples of a structure of the event circuit 130 will be described with reference to FIGS. 6 and 7.

The event circuit 130 may generate different event signals based on a type of events sensed by an active pixel. For example, when a first type of events in which an intensity of light increases is sensed by the active pixel, the event circuit 130 may generate a first event signal. In another example, when a second type of events in which an intensity of light decreases is sensed by the active pixel, the event circuit 130 may generate a second event signal.

The output circuit 140 may output information indicating the active pixel based on the event signal generated by the event circuit 130. The information indicating the active pixel may include, for example, an address of an active pixel in the 2D matrix structure corresponding to the pixel array 110. The address of the active pixel may be represented by column and row coordinates. For example, the output circuit 140 may acquire a row coordinate from a row selected by the selection circuit 120, and acquire a column coordinate from a column corresponding to the active pixel detected by the event circuit 130. The output circuit 140 may be, for example, a data output logic 240 of FIG. 2.

Hereinafter, for convenience of description, an example in which the selection circuit 120 selects a single row from the 2D matrix structure corresponding to the pixel array 110 and the event circuit 130 processes a plurality of columns included in the selected row will be described; however, exemplary embodiments may be variously modified. In an example, the selection circuit 120 may select a single column from the 2D matrix structure corresponding to the pixel array 110, and the event circuit 130 may process a plurality of rows included in the selected column. In another example, when the pixel array 110 does not correspond to the 2D matrix structure, the selection circuit 120 may select pixels from the pixels in the pixel array 110, and the event circuit 130 may process output signals output from the selected pixels.

Depending on exemplary embodiments, the output circuit 140 may include a plurality of sub-output circuits. Each of the sub-output circuits may be connected to a part of the sub-event circuits. An example in which the output circuit 140 includes the sub-output circuits will be further described with reference to FIG. 8.

The event-based sensor 100 may further include a reset circuit. The reset circuit may initialize the active pixel based on the event signal generated by the event circuit 130. The reset circuit may apply a reset signal to the active pixel in response to the event signal. The reset circuit may include an OR element 251 of FIG. 2, and the OR element 251 may perform an OR operation on the first event signal and the second event signal.

Each of pixels in a general event-based sensor may include circuits configured to sense an occurrence of an event and to generate and output an event signal. Unlike the general event-based sensor, in the event-based sensor 100, circuits configured to sense an occurrence of an event and to generate and output an event signal may be separate from the pixels. Accordingly, exemplary embodiments may provide a technology of reducing a size of an individual pixel included in the event-based sensor 100 and of lowering a unit cost of production of the event-based sensor 100.

According to exemplary embodiments, whether an event occurs may be determined outside the pixels, and accordingly a gain offset variation of an analog circuit in each of the pixels and a variation between the pixels due to a process, voltage and temperature (PVT) variation may be pixel-wise recognized and calibrated. Thus, it is possible to increase a yield of a chip and to lower a unit cost of production.

Figure 2:
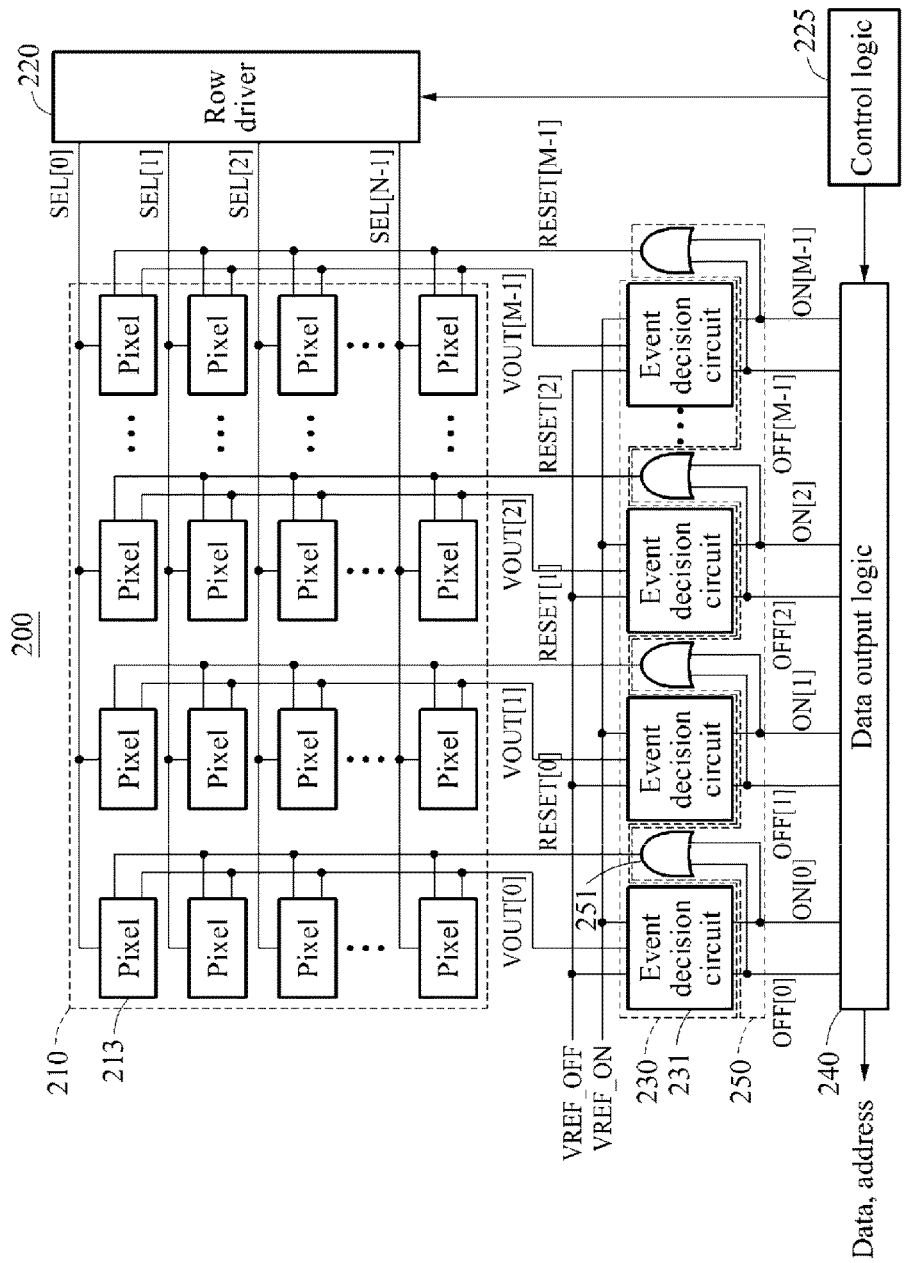
FIG. 2 is a block diagram illustrating a structure of an event-based sensor according to an exemplary embodiment.

FIG. 2 is a block diagram illustrating a structure of an event-based sensor 200 according to an exemplary embodiment. Referring to FIG. 2, the event-based sensor 200 includes the pixel array 210, the row driver 220, a control logic 225, an event circuit 230, the data output logic 240 and a reset circuit 250.

The pixel array 210 may have a size of M bits×N bits. M and N may be natural numbers and may correspond to a horizontal length and a vertical length of the pixel array 210, respectively. For example, M may be a number of columns included in the pixel array 210, and N may be a number of rows included in the pixel array 210. In an example, when the event-based sensor 200 has a video graphics array (VGA) resolution, the pixel array 210 may have a size of 640×480. In another example, when the event-based sensor 200 has a high definition (HD) resolution, the pixel array 210 may have a size of 1280×720. In still another example, when the event-based sensor 200 has a full HD resolution, the pixel array 210 may have a size of 1920×1080. An example of a structure of a pixel 213 included in the pixel array 210 will be described with reference to FIG. 3.

The row driver 220 may select pixels included in each of the rows in the pixel array 210. An output signal VOUT of a pixel selected by the row driver 220 is output to the outside of the pixel array 210. The row driver 220 may sequentially select a plurality of rows included in the 2D matrix structure corresponding to the pixel array 210 based on a predetermined period.

The control logic 225 may control the data output logic 240. For example, the control logic 225 may supply a clock to allow synchronization between the row driver 220 and the data output logic 240. When the clock is supplied from the control logic 225, the row driver 220 may select pixels included in each of the rows in the pixel array 210 based on a selection signal SEL. In this example, each of the selected pixels may output an output signal VOUT corresponding to an amount of change in an intensity of light incident on each of the pixels, in response to a selection signal SEL of the row driver 220.

The event circuit 230 may generate an event signal corresponding to an active pixel that senses an event among the selected pixels based on output signals VOUT output from the selected pixels. In an example, when an event in which an intensity of light increases is sensed by the active pixel, the event circuit 230 may generate an ON event signal. In another example, when an event in which an intensity of light decreases is sensed by the active pixel, the event circuit 230 may generate an OFF event signal.

The event circuit 230 may include a plurality of sub-event circuits corresponding to a plurality of columns included in the 2D matrix structure. A sub-event circuit may include, for example, an event decision circuit 231.

The event decision circuit 231 may compare an output signal VOUT output by a pixel included in a corresponding column to reference signals VREF_ON and VREF_OFF, and may output an ON event signal or an OFF event signal based on the comparison. The reference signals VREF_ON and VREF_OFF may be applied from the outside of the event-based sensor 200. Examples of a structure and an operation of the event circuit 230 will be described with reference to FIGS. 6 and 7.

The data output logic 240 may output an address of the active pixel to the outside of the event-based sensor 200, based on event signals generated by event decision circuits. The address may be, for example, coordinates of the active pixel. The data output logic 240 may unidirectionally output data by a clock signal. In an example, the data output logic 240 may output an address event representation (AER) signal. The data output logic 240 may selectively output, as an AER signal, data corresponding to an address of an active pixel in which an event occurs among pixels included in a row selected by the row driver 220. The data output logic 240 may further output data corresponding to, for example, a type of a sensed event and a time at which an event is sensed, in addition to the data corresponding to the address of the active pixel. In another example, the data output logic 240 may output, as serial data, data corresponding to outputs of pixels included in a row selected by the row driver 220.

The reset circuit 250 applies a reset signal RESET to the active pixel, in response to the event signal output from the event circuit 230. For example, the reset circuit 250 may include "M" OR elements 251 respectively corresponding to the columns in the pixel array 210. The OR element 251 may perform an OR operation on an ON event signal and an OFF event signal and may apply a reset signal RESET to the active pixel.

The event-based sensor 200 may be configured by separating the event decision circuit 231 and the data output logic 240 from individual pixels, and thus a size of each of individual pixels may be reduced. Also, the event-based sensor 200 may output an output signal VOUT of an analog circuit of an individual pixel to the outside of the pixel array 210, and thus a variation between the pixels included in the pixel array 210 may be measured and calibrated.

Figure 3:
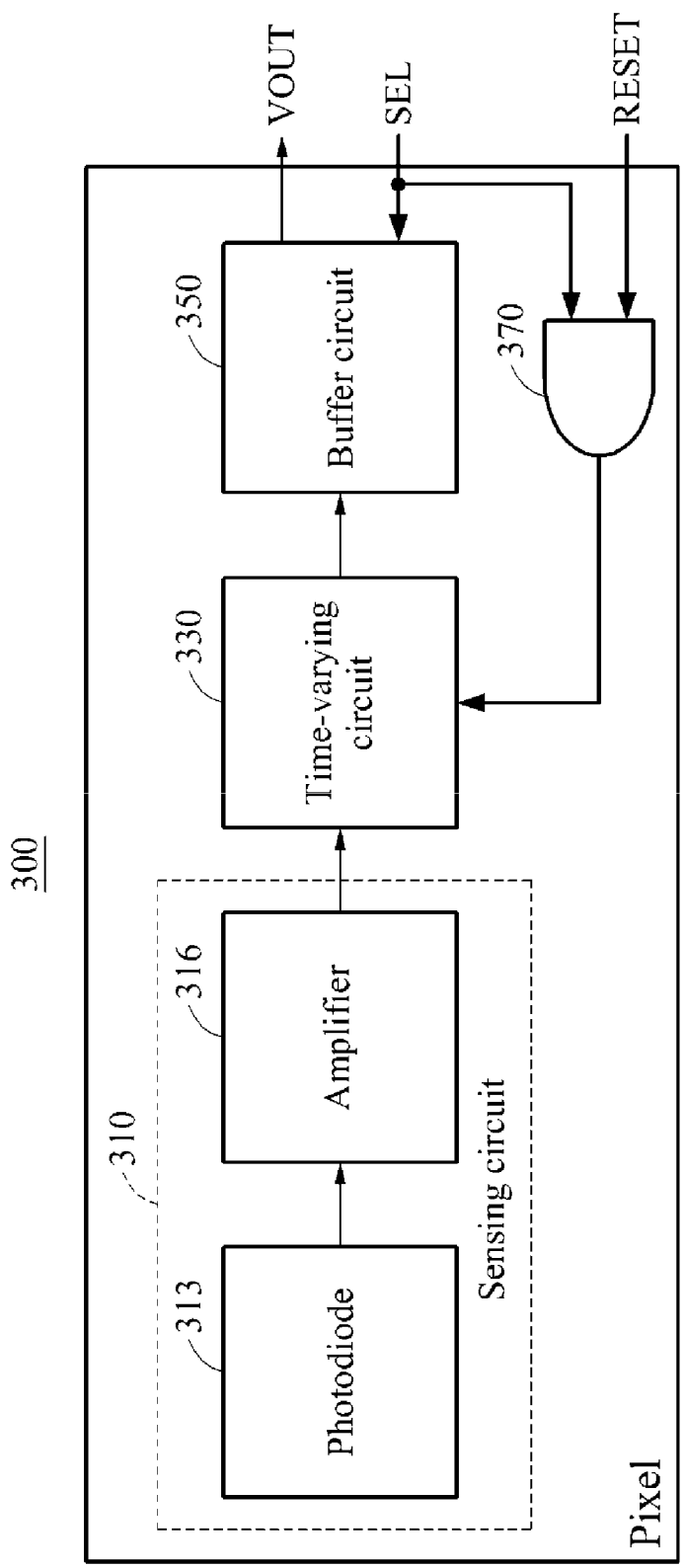
FIG. 3 is a block diagram illustrating a structure of a pixel of an event-based sensor according to an exemplary embodiment.

FIG. 3 is a block diagram illustrating a structure of a pixel 300 of an event-based sensor according to an exemplary embodiment. Referring to FIG. 3, the pixel 300 includes a sensing circuit 310, a time-varying circuit 330, a buffer circuit 350, and a reset circuit 370.

The sensing circuit 310 may generate a first voltage indicating an intensity of light sensed in the pixel 300. For example, in FIG. 3, the sensing circuit 310 includes a photodiode 313 and an amplifier 316. The photodiode 313 may sense an intensity of light incident on the pixel 300. For example, the photodiode 313 may output a current corresponding to a change in an intensity of light received to the pixel 300. The amplifier 316 may convert the current output from the photodiode 313 to the first voltage. The amplifier 316 may amplify an output of the photodiode 313 so that a value of the first voltage may be linearly proportional to the intensity of the light sensed in the pixel 300. For example, an amount of the current output from the photodiode 313 may not be proportional to the intensity of the light sensed in the pixel 300. In this example, a logarithmic amplifier or a logarithmic transimpedance amplifier (TIA) may be used as the amplifier 316, to allow the value of the first voltage to be linearly proportional to the sensed intensity of the light.

The time-varying circuit 330 may generate a second voltage indicating an amount of change in an intensity of light based on the first voltage generated by the sensing circuit 310. For example, the time-varying circuit 330 may store the first voltage in a capacitor during initialization, and may output, as the second voltage, an amount of change in the first voltage based on the stored first voltage. The time-varying circuit 330 may generate the second voltage based on an alternating current (AC) component or a time-varying component of the first voltage. The second voltage generated by the time-varying circuit 330 may indicate the amount of change in the first voltage, and accordingly the time-varying circuit 330 may be referred to as a "differential or differentiation circuit."

The buffer circuit 350 may generate a third voltage having the same value as a value of the second voltage generated by the time-varying circuit 330. For example, the buffer circuit 350 may use a source follower to generate the third voltage. The time-varying circuit 330 may output the third voltage in response to a selection signal SEL being received from a selection circuit, for example, the selection circuit 120 of FIG. 1. The selection signal SEL may be used to read an output voltage VOUT of an analog circuit of the pixel 300, and the third voltage may be an output voltage VOUT of the pixel 300.

The reset circuit 370 may initialize the time-varying circuit 330 (i.e., to store another voltage as the first voltage) in response to a combination of the selection signal SEL and a reset signal RESET received from another reset circuit, for example, the reset circuit 250 described above in FIG. 2. For example, when both the selection signal SEL and the reset signal RESET are received from the outside of the pixel 300, the reset circuit 370 may initialize the time-varying circuit 330.

Figure 4:
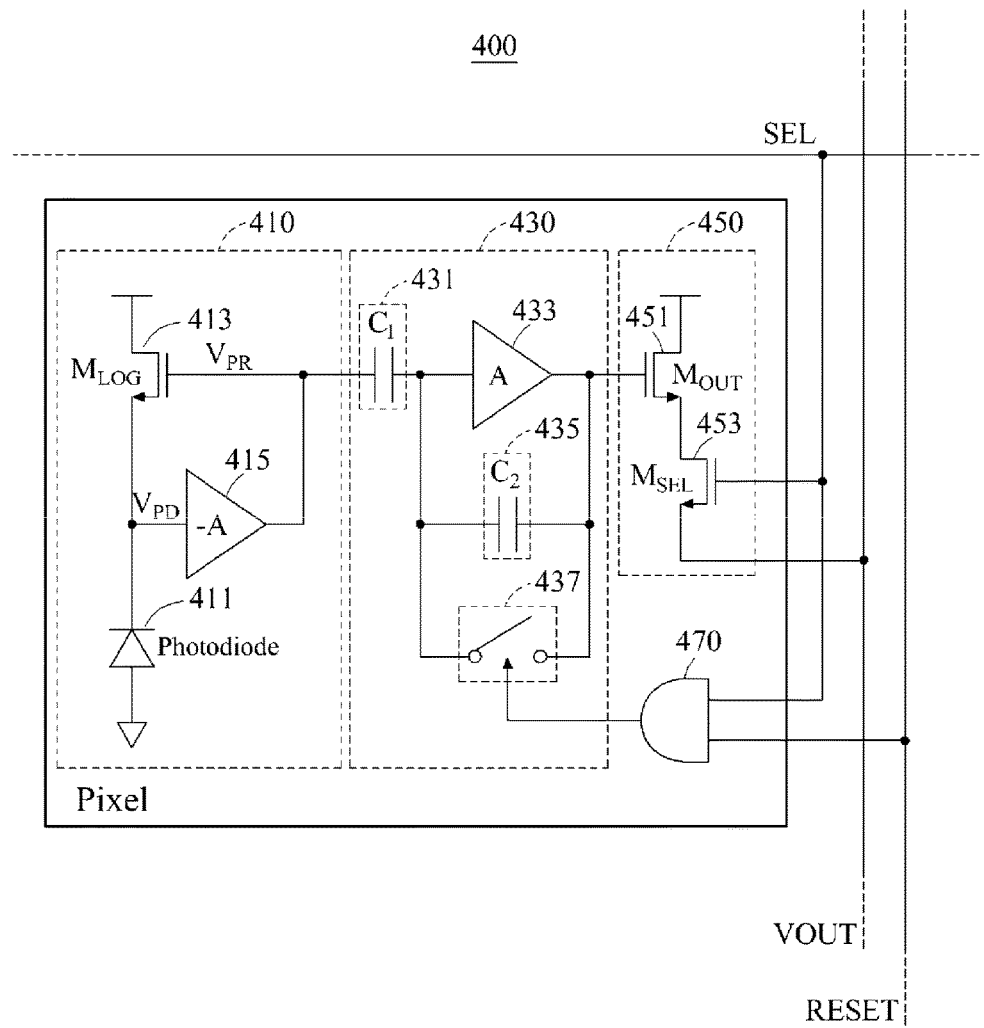
FIG. 4 is a circuit diagram illustrating a pixel of an event-based sensor according to an exemplary embodiment.

FIG. 4 is a circuit diagram illustrating a pixel 400 of an event-based sensor according to an exemplary embodiment. Referring to FIG. 4, the pixel 400 includes a sensing circuit 410, a time-varying circuit 430, a buffer circuit 450, and a reset circuit 470.

In FIG. 4, the sensing circuit 410 includes a photodiode 411, a transistor $M_{LOG}$ 413, and a first amplifier 415. The photodiode 411 may sense an intensity of light incident on the pixel 400. A current may be applied to the transistor $M_{LOG}$ 413 in response to the intensity sensed by the photodiode 411, and a first voltage $V_{PR}$ is generated based on the applied current and output from the sensing circuit 410 to the time-varying circuit 430.

An amount of the current flowing in the transistor $M_{LOG}$ 413 may not be linearly proportional to the sensed intensity of light. The first amplifier 415 may amplify an output voltage $V_{PD}$ of the photodiode 411 in a logarithmic scale so that a value of the first voltage $V_{PR}$ may be linearly proportional to the intensity sensed by the photodiode 411. The first amplifier 415 may be, for example, a logarithmic TIA.

The time-varying circuit 430 may generate a second voltage indicating an amount of change in the intensity of the light, based on the first voltage $V_{PR}$ generated by the sensing circuit 410. In FIG. 4, the time-varying circuit 430 includes a first capacitor $C_1$ 431, a second amplifier 433, a second capacitor $C_2$ 435 and a switch 437.

The first capacitor $C_1$ 431 is connected in series to the first amplifier 415. The first capacitor $C_1$ 431 may store charge based on a change in the first voltage $V_{PR}$ generated by the sensing circuit 410. The second amplifier 433 may amplify a voltage generated by the charge stored in the first capacitor $C_1$ 431 at a preset ratio. An amplification ratio of the second amplifier 433 may be determined as a ratio of a capacitance of the first capacitor $C_1$ 431 and a capacitance of the second capacitor $C_2$ 435 connected in parallel to the second amplifier 433. The second capacitor $C_2$ 435 may be, for example, a feedback capacitor. The first capacitor $C_1$ 431, the second amplifier 433, and the second capacitor $C_2$ 435 may provide an additional voltage gain to a transimpedance gain of the first amplifier 415.

The switch 437 is connected in parallel to the second amplifier 433 and the second capacitor $C_2$ 435, and may reset the charge stored in the first capacitor $C_1$ 431 in response to a selection signal SEL of a selection circuit and a reset signal RESET received through the reset circuit 470 from another reset circuit, for example, the reset circuit 250 described above in FIG. 2. The switch 437 may be, for example, a transistor.

The first capacitor $C_1$ 431 may be reset based on an output voltage of the first amplifier 415 during a reset operation. For example, during the reset operation, an input terminal and an output terminal of the second amplifier 433 may be shorted by the switch 437. In this example, the output voltage of the first amplifier 415 may be applied to one terminal of the first capacitor $C_1$ 431, and an output voltage of the second amplifier 433 of which the input terminal and the output terminal are shorted may be applied to the other terminal of the first capacitor $C_1$ 431. The first capacitor $C_1$ 431 may store a voltage corresponding to a potential difference between both the terminals. The voltage stored in the first capacitor $C_1$ 431 during the reset operation may depend on the output voltage of the first amplifier 415. Hereinafter, the output voltage of the first amplifier 415 during the reset operation may be referred to as a "reset reference voltage."

In FIG. 4, the buffer circuit 450 includes a source follower $M_{OUT}$ 451 and a transistor $M_{SEL}$ 453. The source follower $M_{OUT}$ 451 may generate a third voltage having substantially the same value as a value of the second voltage generated by the time-varying circuit 430. For example, when the second voltage is applied to a gate terminal of the source follower $M_{OUT}$ 451, a third voltage may be generated in a source terminal of the source follower $M_{OUT}$ 451. The transistor $M_{SEL}$ 453 outputs the third voltage as an output voltage VOUT in response to the selection signal SEL of the selection circuit. The third voltage may be, for example, a voltage obtained by subtracting a gate-source voltage $V_{GS}$ of the source follower $M_{OUT}$ 451 from the second voltage.

The reset circuit 470 may reset the time-varying circuit 430 in response to a combination of the selection signal SEL and the reset signal RESET. For example, in FIG. 4, the reset circuit 470 includes an AND element configured to perform an AND operation on a selection signal and a reset signal. The switch 437 in the time-varying circuit 430 may reset an amount of charge stored in the second capacitor $C_2$ 435 based on an output of the AND element.

Figure 5:
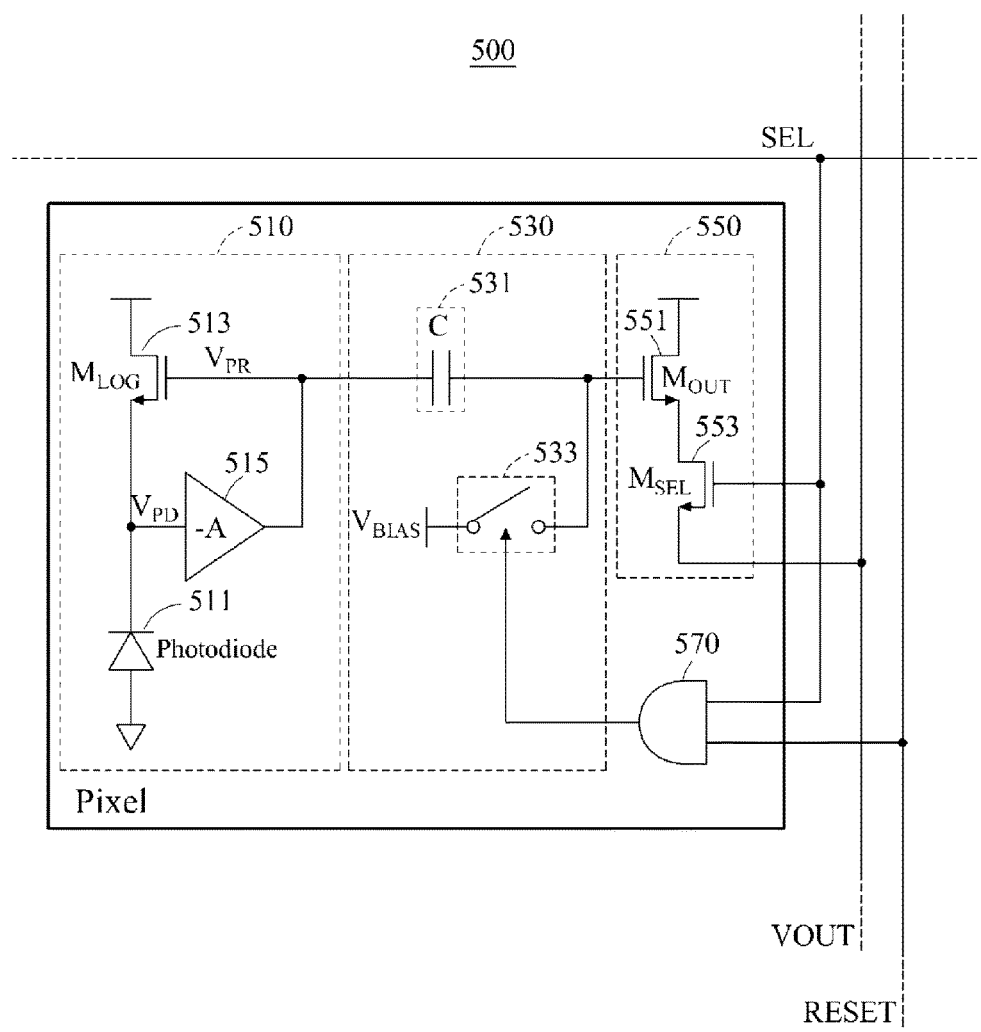
FIG. 5 is a circuit diagram illustrating a pixel including a time-varying circuit according to an exemplary embodiment.

FIG. 5 is a circuit diagram illustrating a pixel 500 including a time-varying circuit 530 according to an exemplary embodiment. Referring to FIG. 5, the pixel 500 includes a sensing circuit 510, the time-varying circuit 530, a buffer circuit 550, and a reset circuit 570. An operation of each of the sensing circuit 510, the buffer circuit 550, and the reset circuit 570 may be the same as an operation of each of the sensing circuit 410, the buffer circuit 450, and the reset circuit 470, respectively, of FIG. 4, and accordingly will not be repeated here.

In FIG. 5, the sensing circuit 510 includes a photodiode 511, a transistor $M_{LOG}$ 513, and an amplifier 515, which correspond to the photodiode 411, the transistor $M_{LOG}$ 413, and the amplifier 415, respectively. The buffer circuit 550 includes a source follower $M_{OUT}$ 551 and a transistor $M_{SEL}$ 553, which correspond to the source follower $M_{OUT}$ 451 and the transistor $M_{SEL}$ 453, respectively.

In FIG. 5, the time-varying circuit 530 includes a first capacitor C 531 and a switch 533. The first capacitor C 531 is connected in series to the amplifier 515. The switch 533 may reset the first capacitor C 531 under a control of the reset circuit 570. During a reset operation, the first capacitor C 531 may store a potential difference between a reset reference voltage (for example, an output voltage of the first amplifier 515) and a bias voltage $V_{BIAS}$.

The pixel 500 of FIG. 5 may be configured by removing the second amplifier 433 and the second capacitor $C_2$ 435 in the time-varying circuit 430 of FIG. 4. Thus, it is possible to further reduce a size of a pixel.

Figure 6:
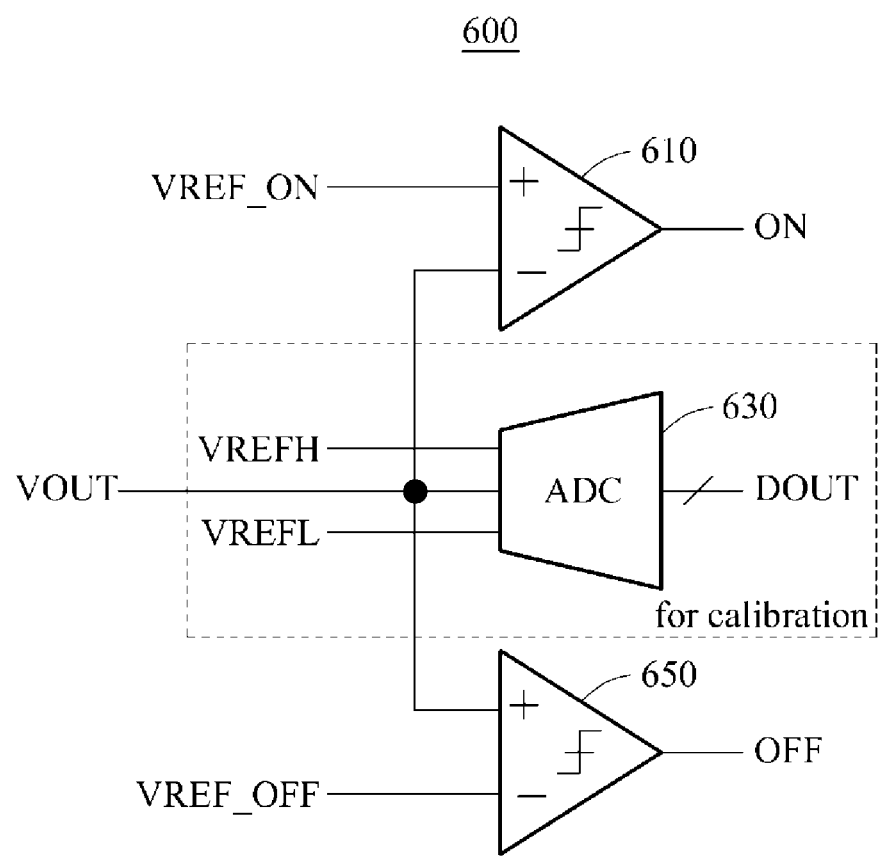
FIG. 6 is a block diagram illustrating an event circuit according to an exemplary embodiment.

FIG. 6 is a block diagram illustrating an event circuit 600 according to an exemplary embodiment. Referring to FIG. 6, the event circuit 600 includes a first comparator 610 and a second comparator 650.

The first comparator 610 compares a first reference signal VREF_ON to an output signal VOUT of a pixel, to determine whether an ON event is sensed by an active pixel. When the output signal VOUT is greater than the first reference signal VREF_ON, the first comparator 610 generates an ON event signal.

The second comparator 650 compares a second reference signal VREF_OFF to the output signal VOUT, to determine whether an OFF event is sensed by an active pixel. When the output signal VOUT is less than the second reference signal VREF_OFF, the second comparator 650 generates an OFF event signal.

In FIG. 6, the event circuit 600 further includes an analog-to-digital converter (ADC) 630. The ADC 630 measures a strength of the output signal VOUT as a digital output signal DOUT for calibration. The ADC 630 may be, for example, an n-bit ADC. The n-bit ADC may measure the strength of the output signal VOUT at $2^n$ levels. For example, when the ADC 630 is a 2-bit ADC, the strength of the output signal VOUT may be measured at four levels, that is, 00, 01, 10 and 11 between reference signals VREFH and VREFL. The four levels may be, for example, a level less than the reference signal VREFL, a level from the reference signal VREFL to "0," a level from "0" to the reference signal VREFH, and a level exceeding the reference signal VREFH.

According to an exemplary embodiment, an output value of each pixel may be accurately recognized by the ADC 630, and accordingly a variation between pixels may be calibrated using the output value. For example, when a reset reference voltage of each of pixels changes due to a variation between the pixels during a reset operation, or when a variation in a transimpedance gain between a voltage of an output signal VOUT and a photocurrent of each of the pixels occurs, different output signals VOUT may be output from the pixels even though the same illuminance variation is sensed. Due to the different output signals VOUT, fixed-pattern noise may occur in an event circuit.

The variation between the pixels refers to a variation generated when the pixels output signals of different magnitudes despite the same illumination variation. The ADC 630 may output an n bit (i.e., the digital output signal DOUT) as a magnitude of an output signal of each of the pixels. A host system using the event-based sensor 100 may calibrate the variation between the pixels based on the digital output signal DOUT of the ADC 630. For example, to acquire information about the variation between the pixels, a lighting environment may be controlled so that the same illumination variation may be sensed by all the pixels. In this example, even though the pixels sense the same illumination variation by the variation between the pixels, signals of different magnitudes may be output. The host system may collect, using the ADC 630, information about a magnitude of a signal output by each of the pixels based on the same illumination variation. The host system may generate information about the variation between the pixels based on the collected information. The host system may calibrate a magnitude of a signal output by each of the pixels in an actual operation environment, based on the information about the variation between the pixels.

Figure 7:
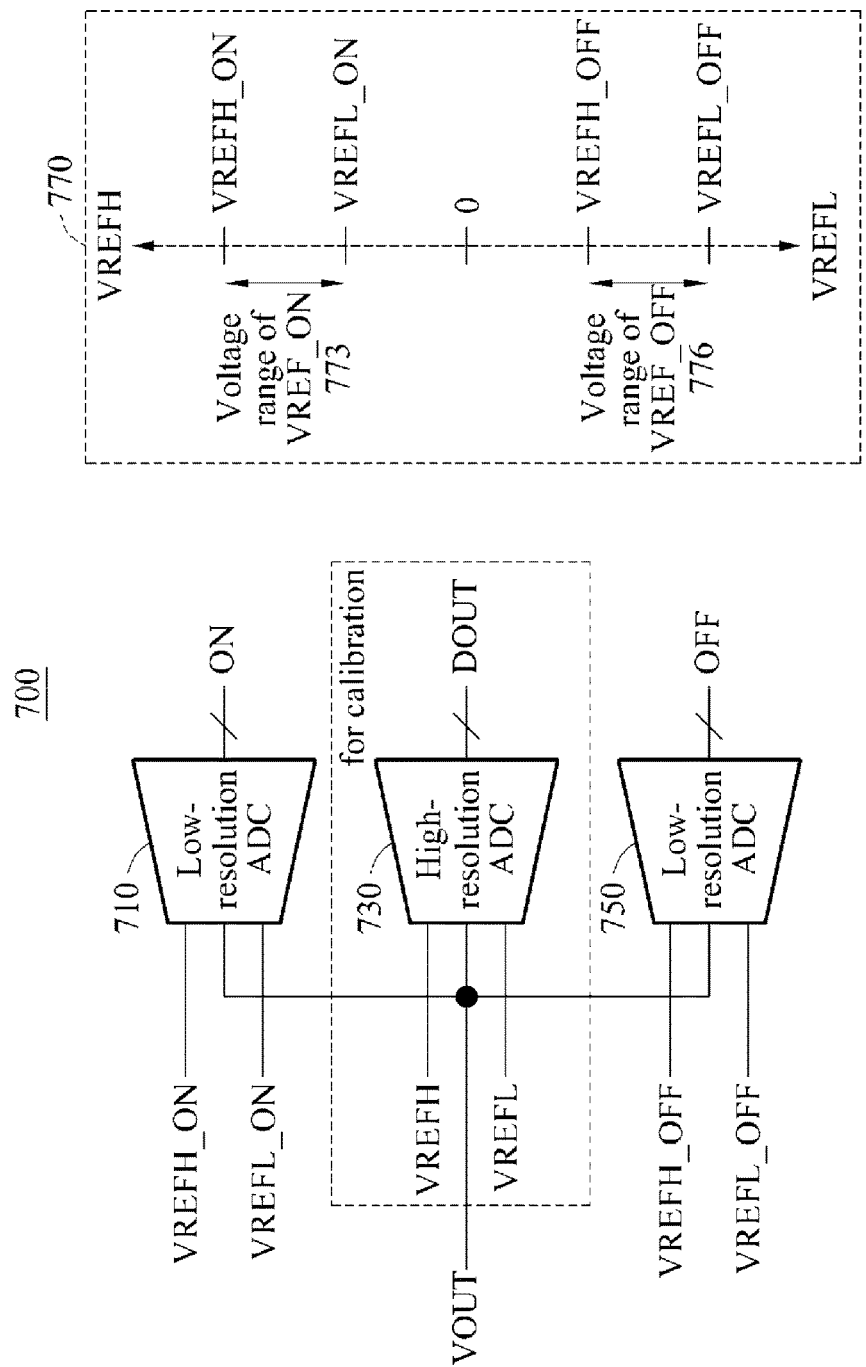
FIG. 7 is a block diagram illustrating an event circuit according to another exemplary embodiment.

FIG. 7 is a block diagram illustrating an event circuit 700 according to another exemplary embodiment. Referring to FIG. 7, the event circuit 700 includes a first low-resolution ADC 710 and a second low-resolution ADC 750.

The event circuit 700 uses the first low-resolution ADC 710 and the second low-resolution ADC 750, instead of the first comparator 610 and the second comparator 650 of FIG. 6. The first comparator 610 and the second comparator 650 may use the first reference signal VREF_ON and the second reference signal VREF_OFF, respectively.

When the first low-resolution ADC 710 and the second low-resolution ADC 750 are used, a multi-bit ON event signal or a multi-bit OFF event signal are output, instead of a 1-bit ON event signal or a 1-bit OFF event signal output from the first comparator 610 and the second comparator 650.

As indicated by a dashed box 770, the first low-resolution ADC 710 uses two reference voltages VREFH_ON and VREFL_ON corresponding to a voltage range 773 of the first reference signal VREF_ON. Also, the second low-resolution ADC 750 uses two reference voltages VREFH_OFF and VREFL_OFF corresponding to a voltage range 776 of the second reference signal VREF_OFF.

The event circuit 700 may determine whether an ON event occurs in a pixel or an OFF event occurs in the pixel due to a variation between known pixels in a back-end, based on information on the variation, using the output multi-bit ON event signal or the output multi-bit OFF event signal.

For example, when two reference voltages are used in an ADC, an interval between the two reference voltages may be divided into n bits, and the n bits may be output. Based on an ADC resolution, the n bits may be output instead of 2 bits, for example,

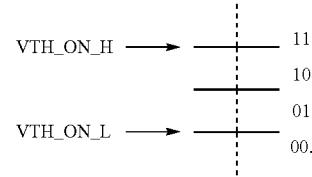

A reference signal between reference voltages VREF_H and VREF_L may be generated through resistive/capacitive voltage dividing, or generated through capacitive charge sharing, and various methods may be used. How to generate the reference signal may be determined by a designer based on a design specification or an area to be designed. In addition, an operating power of the ADC may be higher or lower than the reference voltage VREF_H. A flash ADC structure may be used as a low-resolution ADC with 6 bits or less.

When the multi-bit ON event signal or the multi-bit OFF event signal is generated, as shown in FIG. 7, a reset signal may be generated in the back-end based on the multi-bit ON event signal or the multi-bit OFF event signal. In this example, a reset circuit in a system may transfer the generated reset signal to a corresponding pixel, instead of directly generating a reset signal.

In FIG. 7, the event circuit 700 further includes a high-resolution ADC 730. The high-resolution ADC 730 measures a strength of an output signal VOUT of a pixel as a digital output signal DOUT. For example, when the high-resolution ADC 730 is an n-bit ADC, the n-bit ADC may measure the strength of the output signal VOUT at $2^n$ levels. As described above, the high-resolution ADC 730 may be used to calibrate a variation between pixels.

Figure 8:
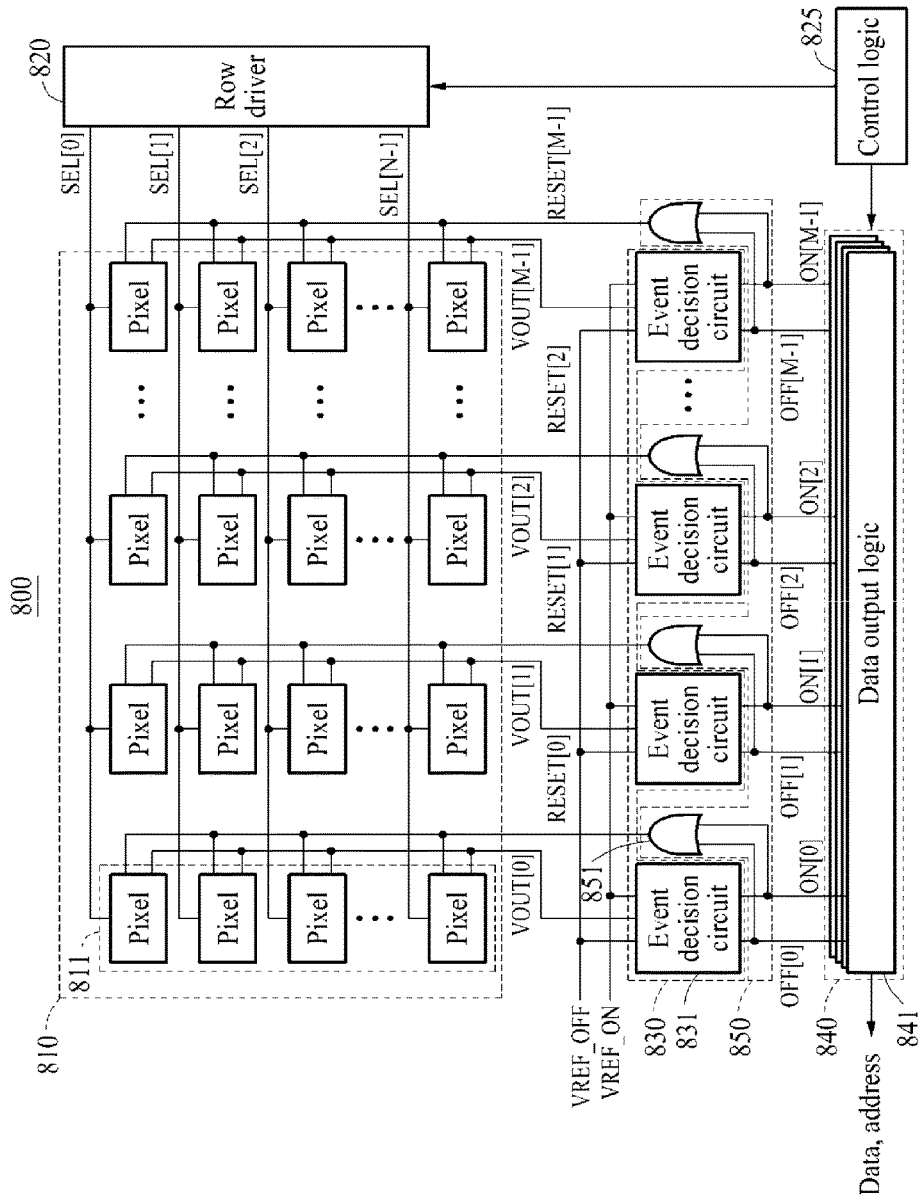
FIG. 8 is a block diagram illustrating a structure of an event-based sensor according to another exemplary embodiment.

FIG. 8 is a block diagram illustrating a structure of an event-based sensor 800 according to another exemplary embodiment. Referring to FIG. 8, the event-based sensor 800 includes a pixel array 810, a row driver 820, an event circuit 830, a data output logic 840, a reset circuit 850, and a control logic 825.

Unlike the data output logic 240 in the event-based sensor 200 of FIG. 2, the data output logic 840 may include a plurality of sub-output circuits, for example, "M" sub-output circuits corresponding to "M" columns included in the pixel array 810. Each of the sub-output circuits may be connected to a part of an OR element and a plurality of sub-event circuits.

For example, when the "M" sub-output circuits are arranged in parallel, a first sub-output circuit 841 among the "M" sub-output circuits is connected to a first event decision circuit 831 and an OR element 851. In this example, the first event decision circuit 831 processes an output signal VOUT [0] output from a first column 811 in the pixel array 810, and the OR element 851 transfers a reset signal RESET[0] to an active pixel included in the first column 811. The first sub-output circuit 841 may operate regardless of operations of (M−1) columns other than the first column 811.

Each of the sub-output circuits may output an AER signal with relatively few bits in comparison to the data output logic 240. For example, when four sub-output circuits are provided, each of the four sub-output circuits may output an AER signal by excluding lower two bits.

When an AER signal is received to an external device, the external device may restore the lower two bits based on which sub-output circuit transmits the AER signal to the external device. For example, a first sub-output circuit, a second sub-output circuit, a third sub-output circuit, and a fourth sub-output circuit may correspond to bit values "00," "01," 10," and "11," respectively.

An operation of each of the pixel array 810, the row driver 820, the event circuit 830, the reset circuit 850 and the control logic 825 of FIG. 8 may be the same as an operation of each of the pixel array 210, the row driver 220, the event circuit 230, the reset circuit 250 and the control logic 225, respectively, of FIG. 2, and accordingly will not be repeated here.

Figure 9:
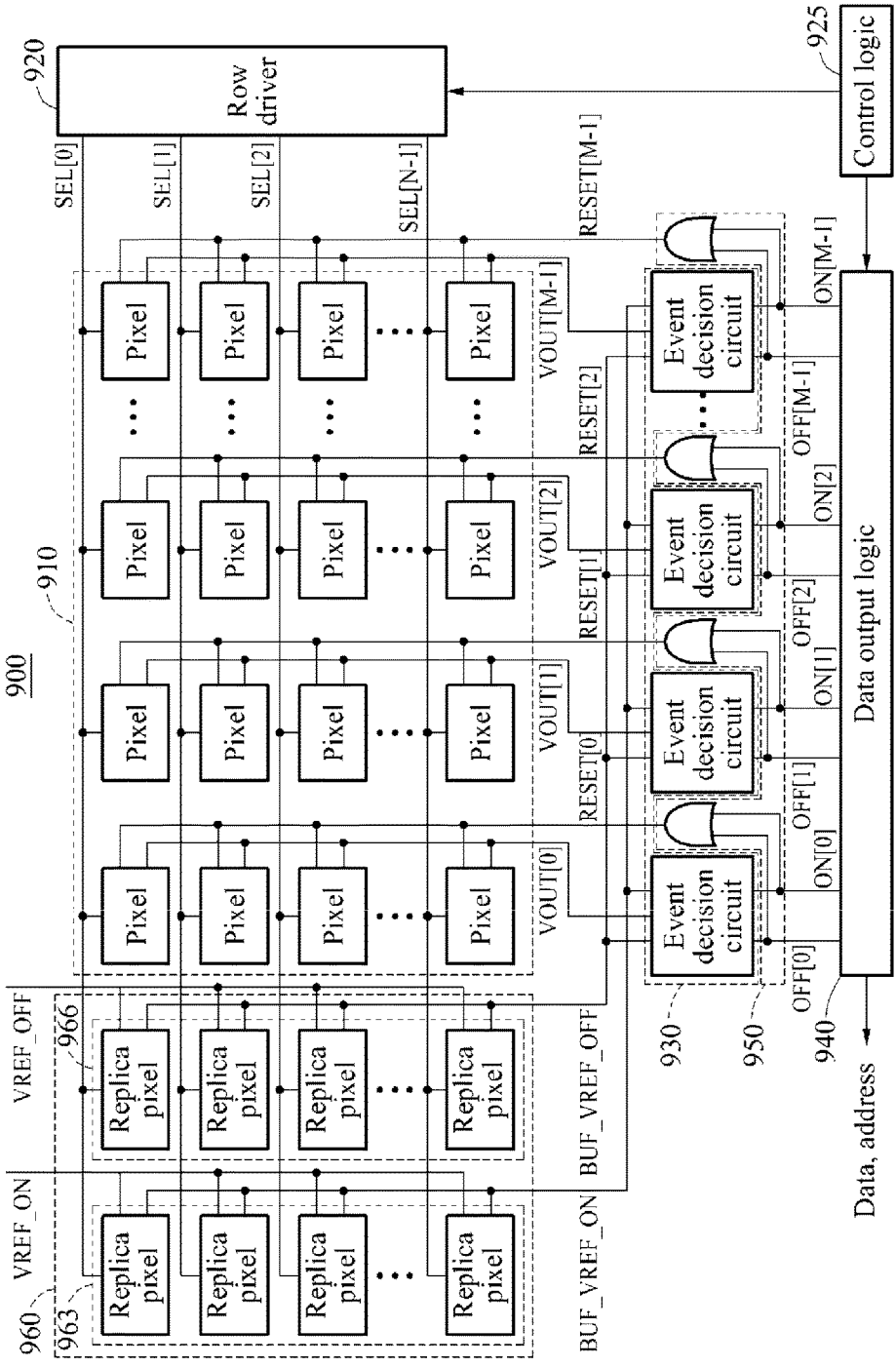
FIG. 9 is a block diagram illustrating a structure of an event-based sensor including a reference signal providing circuit according to an exemplary embodiment.

FIG. 9 is a block diagram illustrating a structure of an event-based sensor 900 including a reference signal providing circuit 960 according to an exemplary embodiment. Referring to FIG. 9, the event-based sensor 900 includes a pixel array 910, a row driver 920, a control logic 925, an event circuit 930, a data output logic 940, a reset circuit 950, and the reference signal providing circuit 960.

An operation of each of the pixel array 910, the row driver 920, the control logic 925, the event circuit 930, the data output logic 940 and the reset circuit 950 may be the same as an operation of each of the pixel array 210, the row driver 220, the control logic 225, the event circuit 230, the data output logic 240 and the reset circuit 250, respectively, of FIG. 2, and accordingly will not be repeated here.

The reference signal providing circuit 960 may provide a reference signal that is based on a voltage drop to the event circuit 930. In FIG. 9, the reference signal providing circuit 960 includes a plurality of replica pixels corresponding to a plurality of rows included in a 2D matrix structure corresponding to the pixel array 910. For example, replica pixels corresponding to a first row in the pixel array 910 may output reference signals in response to a signal SEL[0] to select the first row.

When a clock is supplied from the control logic 925, the row driver 920 may select pixels included in each of the rows in the pixel array 910 based on a selection signal SEL. The selection signal SEL may be provided to each of rows of the reference signal providing circuit 960 as well as each of the rows in the pixel array 910. Each of the replica pixels in the reference signal providing circuit 960 may output an output signal, that is, a reference signal.

Each of pixels included in the pixel array 910 may output an output signal corresponding to an amount of change in an intensity of light in response to a selection of the row driver 920. Unlike the pixels in the pixel array 910, each of the replica pixels may output a preset reference signal BUF_VREF_ON or BUF_VREF_OFF.

Reference signals output from the replica pixels may be supplied to the event circuit 930 and may be compared to output signals VOUT of the pixels. An example of an operation between the pixels in the pixel array 910 and the replica pixels in the reference signal providing circuit 960 will be described with reference to FIG. 10.

Figure 10:
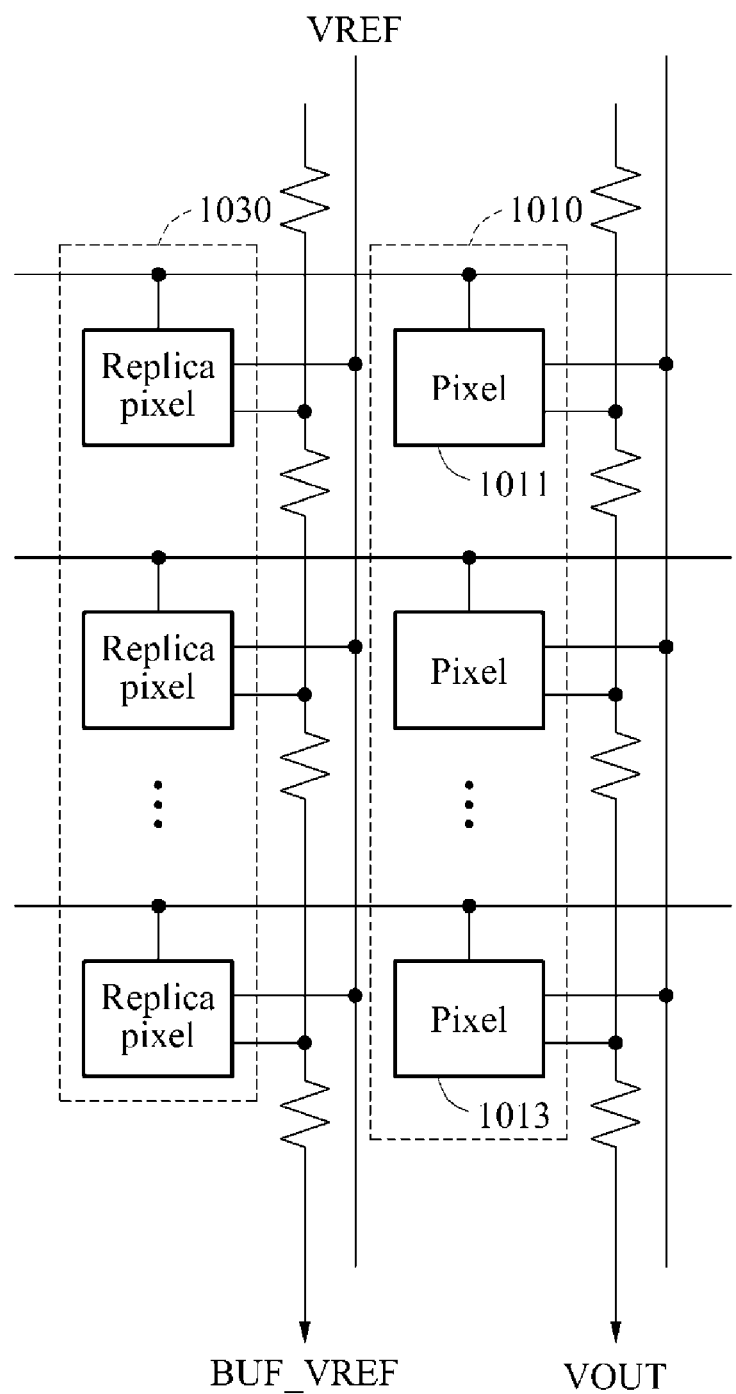
FIG. 10 illustrates an operation between pixels included in a pixel array and replica pixels included in a reference signal providing circuit according to an exemplary embodiment.

FIG. 10 illustrates pixels 1010 included in a pixel array, and replica pixels 1030 included in a reference signal providing circuit. As described above, when a selection signal is transferred to the pixels 1010 by a row driver, each of the pixels 1010 may output an output signal corresponding to an amount of change in an intensity of light incident on each of the pixels 1010 in response to a selection of the row driver.

The output signal may be transferred to an event circuit along an electric lead. The electric lead may have an internal resistance, and an amount of a voltage drop of an output signal output from a pixel may be determined based on a position of a row to which the pixel belongs.

For example, an output signal of a pixel 1013 in a row closest to the event circuit may be transferred to the event circuit immediately after a voltage drops due to a single resistance component. On the contrary, an output signal of a pixel 1011 in a row farthest from the event circuit may be transferred to the event circuit immediately when a voltage drops due to a plurality of resistance components.

Due to the voltage drop, values of the output signals transferred to the event circuit may be different from values of output signals of the pixels 1010. For example, when the event circuit output signals of all pixels to the same reference signal, an error may occur due to a voltage drop based on locations of the pixels.

The reference signal providing circuit of FIG. 10 may allow a voltage of a reference signal VREF to drop due to the same resistance components, similarly to the voltage drop during transferring of the output signals, and may allow a reference signal BUF_VREF based on the voltage drop to be output.

Referring back to FIG. 9, the reference signal providing circuit 960 includes first replica pixels 963 and second replica pixels 966. The first replica pixels 963 output a reference signal BUF_VREF_ON for a first type of events in which an intensity of light increases. The second replica pixels 966 output a reference signal BUF_VREF_OFF for a second type of events in which an intensity of light decreases.

Reference signals VREF_ON and VREF_OFF input to the reference signal providing circuit 960 may be used to determine whether an output signal of a pixel received at the event circuit 930 corresponds to the first type of events or the second type of events. The reference signal providing circuit 960 may allow a voltage of the reference signals VREF_ON and VREF_OFF to drop, similarly to the voltage drop of the output signal of the pixel, and thus it is possible to prevent a malfunction due to the voltage drop.

Figure 11:
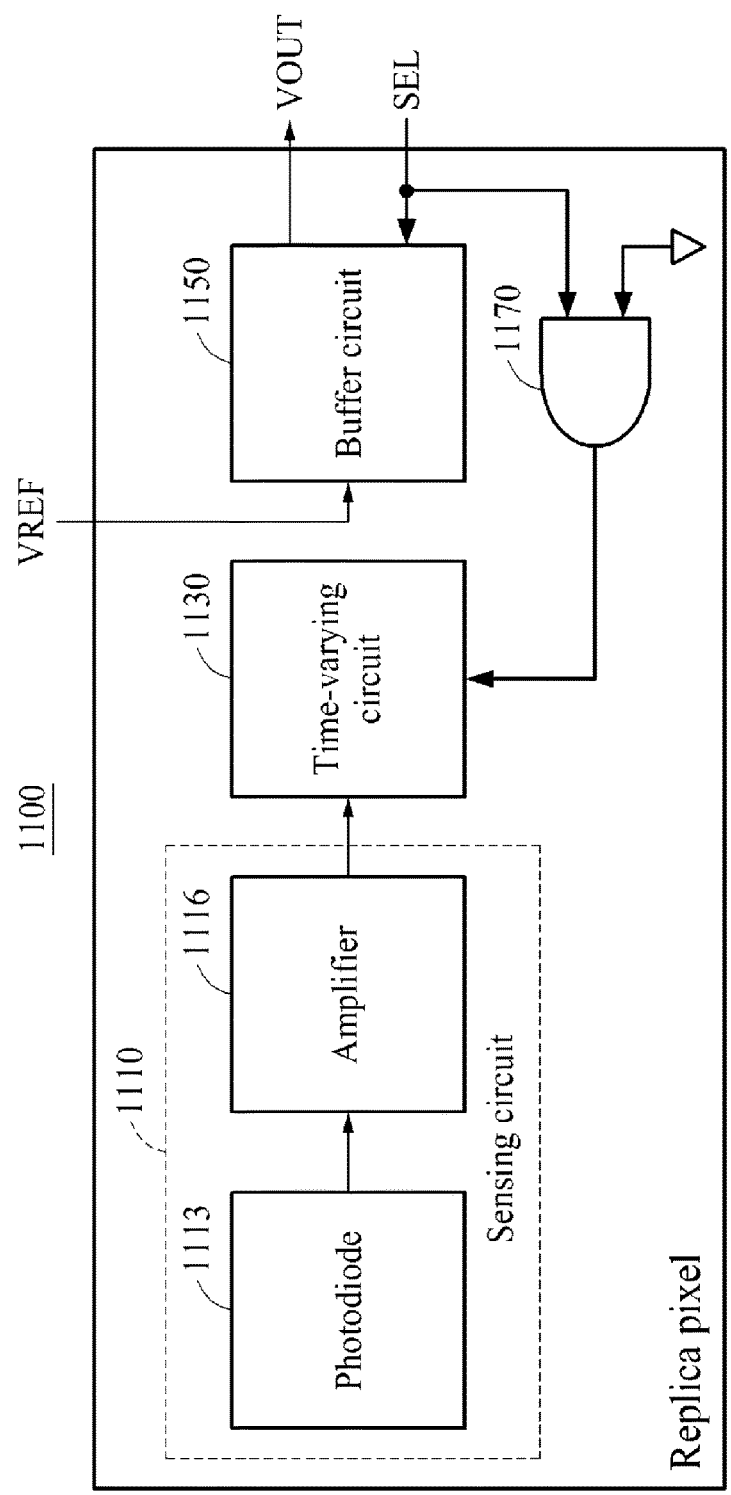
FIG. 11 is a block diagram illustrating a structure of a replica pixel according to an exemplary embodiment.

FIG. 11 is a block diagram illustrating a structure of a replica pixel 1100 according to an exemplary embodiment. Referring to FIG. 11, the replica pixel 1100 includes a buffer circuit 1150.

The buffer circuit 1150 outputs an output signal VOUT having the same voltage as a voltage of a reference signal VREF input to the buffer circuit 1150, in response to a selection signal SEL received from a selection circuit, for example, the selection circuit 120 of FIG. 1. The buffer circuit 1150 may include a source follower.

In FIG. 11, the replica pixel 1100 further includes a sensing circuit 1110 including a photodiode 1113 and an amplifier 1116, a time-varying circuit 1130, and a reset circuit 1170. Unlike the above-described structures of the pixels, an output of the time-varying circuit 1130 in the replica pixel 1100 is not connected to the buffer circuit 1150. Also, a ground signal GND is applied to an input terminal of the reset circuit 1170 that receives a reset signal.

The sensing circuit 1110, the time-varying circuit 1130, and the reset circuit 1170 in the replica pixel 1100 may have the same configuration as the sensing circuit 310, the time-varying circuit 330, and the reset circuit 370, respectively, of FIG. 3, and may be provided to reduce a complexity of a circuit design in an actual chip production, instead of being provided to sense an event.

In addition, the exemplary embodiments may also be implemented through computer-readable code and/or instructions on a medium, e.g., a computer-readable medium, to control at least one processing element to implement any above-described embodiments. The medium may correspond to any medium or media serving as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An event-based sensor comprising:
a pixel array comprising a plurality of pixels;
a selection circuit configured to select a part of the plurality of pixels;
an event circuit configured to generate an event signal indicating an active pixel sensing an event among the part of the plurality of pixels that is selected, based on output signals of the part of the plurality of pixels that is selected;
a reset circuit configured to receive the event signal from the event circuit, and reset the active pixel, based on the event signal being received; and
an output circuit configured to output information indicating the active pixel, based on the event signal,
wherein the event comprises a change in an intensity of light.

2. The event-based sensor of claim 1, wherein the event signal has address information of the active pixel.

3. The event-based sensor of claim 1, wherein each of the plurality of pixels is configured to output a corresponding one of the output signals that indicates an amount of the change in the intensity of light, in response to the selection circuit selecting a corresponding one of the plurality of pixels.

4. The event-based sensor of claim 1, wherein the reset circuit is further configured to apply a reset signal to the active pixel, in response to the event signal being received.

5. The event-based sensor of claim 1, wherein the pixel array has a two-dimensional (2D) matrix structure, and
the selection circuit is configured to sequentially select rows included in the 2D matrix structure, based on a period.

6. The event-based sensor of claim 1, wherein the event circuit comprises:
a comparator configured to compare one of the output signals to a reference signal, to generate the event signal; and
an analog-to-digital converter (ADC) configured to measure a strength of the one of the output signals.

7. The event-based sensor of claim 1, wherein the event circuit comprises:
a low-resolution analog-to-digital converter (ADC) configured to compare one of the output signals to reference signals, to generate the event signal; and
a high-resolution ADC configured to measure a strength of the one of the output signals.

8. The event-based sensor of claim 1, wherein the pixel array has a two-dimensional (2D) matrix structure, and
the event circuit comprises sub-event circuits corresponding to columns included in the 2D matrix structure.

9. The event-based sensor of claim 8, wherein the output circuit comprises sub-output circuits, and
each of the sub-output circuits is connected to a corresponding one of the sub-event circuits.

10. The event-based sensor of claim 1, wherein the event circuit is further configured to:
generate a first event signal, in response to the active pixel sensing a first type of events in which the intensity of light increases; and
generate a second event signal, in response to the active pixel sensing a second type of events in which the intensity of light decreases.

11. The event-based sensor of claim 1, wherein each of the plurality of pixels comprises:
a sensing circuit configured to sense the intensity of light, and generate a first voltage indicating the intensity of light that is sensed;
a time-varying circuit configured to generate a second voltage indicating an amount of the change in the intensity of light, based on the first voltage; and
a buffer circuit configured to output a third voltage having a first value that is same as a second value of the second voltage, in response to the selection circuit selecting a corresponding one of the plurality of pixels.

12. The event-based sensor of claim 11, wherein the sensing circuit comprises:
a photodiode configured to sense the intensity of light that is incident on the corresponding one of the plurality of pixels; and
a first amplifier configured to amplify an output of the photodiode so that a third value of the first voltage is linearly proportional to the intensity of light that is sensed.

13. The event-based sensor of claim 11, wherein the time-varying circuit comprises a capacitor connected in series to the sensing circuit.

14. The event-based sensor of claim 13, wherein the time-varying circuit further comprises a second amplifier configured to amplify, at a ratio, an amount of charge that is stored in the capacitor, based on the first voltage that is changed.

15. The event-based sensor of claim 13, wherein the time-varying circuit further comprises a switch configured to reset an amount of charge that is stored in the capacitor, based on a reset signal and the corresponding one of the plurality of pixels being selected.

16. The event-based sensor of claim 11, wherein the buffer circuit comprises:
a source follower configured to generate the third voltage, based on the second voltage; and
a transistor configured to output the third voltage, in response to the corresponding one of the plurality of pixels being selected.

17. The event-based sensor of claim 1, further comprising a reference signal providing circuit configured to provide a reference signal to the event circuit, based on a voltage drop.

18. The event-based sensor of claim 17, wherein the pixel array has a two-dimensional (2D) matrix structure,
the reference signal providing circuit comprises a plurality of replica pixels corresponding to rows included in the 2D matrix structure, and
each of the plurality of replica pixels is configured to output the reference signal, in response to the selection circuit selecting a corresponding one of the plurality of replica pixels.

19. The event-based sensor of claim 17, wherein the reference signal providing circuit comprises:
first replica pixels configured to output a first reference signal for a first type of events in which the intensity of light increases; and
second replica pixels configured to output a second reference signal for a second type of events in which the intensity of light decreases.

20. A pixel of an event-based sensor, the pixel comprising:
a sensing circuit configured to sense an intensity of light, and generate a first signal indicating the intensity of light that is sensed;
a time-varying circuit configured to generate a second signal indicating an amount of a change in the intensity of light, based on the first signal;
a buffer circuit configured to output a third signal having a first strength that is the same as a second strength of the second signal, in response to a selection signal; and
a reset circuit comprising an AND element configured to perform an AND operation on a reset signal and the selection signal,
wherein the time-varying circuit is further configured to reset, based on an output of the AND element, and
wherein an event comprises the change in the intensity of light.

21. The pixel of claim 20, wherein the sensing circuit comprises:
a photodiode configured to sense the intensity of light that is incident on the pixel; and
a first amplifier configured to amplify an output of the photodiode so that a third strength of the first signal is linearly proportional to the intensity of light that is sensed.

22. The pixel of claim 20, wherein the time-varying circuit comprises a capacitor connected in series to the sensing circuit.

23. The pixel of claim 22, wherein the time-varying circuit further comprises a second amplifier configured to amplify, at a ratio, an amount of charge that is stored in the capacitor, based on the first signal that is changed.

24. The pixel of claim 22, wherein the time-varying circuit further comprises a switch configured to reset an amount of charge that is stored in the capacitor, based on the output of the AND element and a bias voltage.

25. The pixel of claim 20, wherein the buffer circuit comprises:
a source follower configured to generate the third signal, based on the second signal; and
a transistor configured to output the third signal, in response to the selection signal.

26. An event-based sensor comprising:
a pixel array comprising a plurality of pixels;
a row driver configured to activate first pixels in a row of the plurality of pixels, each of the plurality of pixels that are activated being configured to generate an output signal indicating an amount of a change in an intensity of light that is incident on a corresponding one of the plurality of pixels that are activated;
an event circuit configured to generate an event signal indicating an activated pixel sensing an event among the plurality of pixels that are activated, based on the output signal of each of the plurality of pixels that are activated;
a reset circuit configured to receive the event signal from the event circuit, and reset the activated pixel, based on the event signal being received; and
an output circuit configured to output information indicating the activated pixel, based on the event signal,
wherein the event comprises the change in the intensity of light.

27. The event-based sensor of claim 26, wherein the reset circuit comprises an OR element configured to apply a reset signal to the activated pixel, based on the event signal being received.

28. The event-based sensor of claim 26, wherein the event circuit comprises:
a first comparator configured to determine whether the output signal is greater than a first reference signal, and generate a first event signal indicating a first type of events in which the intensity of light increases, in response to the first comparator determining that the output signal is greater than the first reference signal; and
a second comparator configured to determine whether the output signal is less than a second reference signal, and generate a second event signal indicating a second type of events in which the intensity of light decreases, in response to the second comparator determining that the output signal is less than the second reference signal.

* * * * *